United States Patent [19]

Hattori et al.

[11] Patent Number: 4,710,320

[45] Date of Patent: Dec. 1, 1987

[54] METHOD FOR PRODUCING 1-AMINO-2-PHENOXY-4-HYDROXYAN-THRAQUINONES

[75] Inventors: Makoto Hattori, Toyonaka; Masao Nishikuri, Hirakata; Yasuyoshi Ueda, Toyonaka, all of Japan

[73] Assignee: Sumitomo Chemical Company, Limited, Osaka, Japan

[21] Appl. No.: 753,860

[22] Filed: Jul. 11, 1985

[30] Foreign Application Priority Data

Jul. 19, 1984 [JP] Japan .................................. 59-150868

[51] Int. Cl.$^4$ ............................................. C07C 97/26
[52] U.S. Cl. ..................................... 260/378; 260/380
[58] Field of Search ................................ 260/378, 380

[56] References Cited

U.S. PATENT DOCUMENTS

| | | | |
|---|---|---|---|
| 3,538,129 | 11/1970 | Sato et al. ............... | 260/380 |
| 3,968,131 | 7/1976 | Maier ....................... | 260/380 |
| 4,278,606 | 7/1981 | Hiller et al. .............. | 260/380 |
| 4,294,769 | 10/1981 | Kröck et al. .............. | 260/378 |
| 4,299,771 | 11/1981 | Takeshita et al. ........ | 260/378 |
| 4,485,043 | 11/1984 | Kniel ....................... | 260/380 |

OTHER PUBLICATIONS

*Hackh's Chemical Dictionary*, 4th ed., 1977, p. 646.
*Chemical Abstract*, vol. 68, No. 96800p, Elton Head, 1967, French Abstract to fr 1,478,768.
Abstract 21,736q, Hoechst A.G., 2/27/69, German Abstract to GE 1,444,761.
*Chemical Abstract*, vol. 79, No. 105,006r, Mori et al, 1973, Japan Kokai Abstract 7337432.
*Chemical Abstract*, vol. 85, No. 70926g, Shiteinberg et al, 1976, Synthesis of Phenoxy Derivatives of Anthraquinone in an Aqueous Medium.

*Primary Examiner*—Glennon H. Hollrah
*Assistant Examiner*—Raymond Covington
*Attorney, Agent, or Firm*—Stevens, Davis, Miller & Mosher

[57] ABSTRACT

1-Amino-2-phenoxy-4-hydroxyanthraquinones, which are useful as a red disperse dye for polyester fibers, and also useful as an intermediate for the production of other red disperse dyes, are produced in a high yield and purity by reacting a 1-amino-2-halogeno-4-hydroxyanthraquinone with a phenol compound in a sulfane solvent in the presence of an acid binding agent.

11 Claims, No Drawings

METHOD FOR PRODUCING 1-AMINO-2-PHENOXY-4-HYDROXYAN-THRAQUINONES

The present invention relates to a method for producing 1-amino-2-phenoxy-4-hydroxyanthraquinones.

1-Amino-2-phenoxy-4-hydroxyanthraquinones are useful as a red disperse dye for polyester fibers, and also useful as an intermediate for producing other red disperse dyes.

As well known, these anthraquinone dye compounds have been produced by the reaction between a 1-amino-2-halogeno-4-hydroxyanthraquinone and a phenol compound in a certain organic solvent in the presence of an acid binding agent. With respect to the organic solvent to be used, there are known the reacting phenol compound itself as disclosed in, for example, French patent No. 1,478.768, and a polar solvent such as dimethylforamide, dimethylsulfoxide and the like as disclosed in German Offenlegungsschrift No. 1,444,761 and Published Unexamined Japanese Patent Application No. 37432/1973. However, the former requires great labor and energy for recovery of the excess phenol compound, and according to the latter, it is inevitable to produce by-products in a large amount because of insufficient stability of the solvent at a high temperature, and therefore it is hard to obtain a desired dye compound capable of giving dyed products of a brilliant color in a high yield.

A method wherein the reaction between a 1-amino-2-halogeno-4-hydroxyanthraquinone and a phenol compound is carried out in an aqueous medium in the presence of a dispersing agent, is also disclosed in Zh. Prinkl. Khim. 49 (1976), 4, pp. 904 to 905. According to this method, however, yield of the desired dye compound is at most about 90%.

Moreover, as disclosed in Published Unexamined Japanese patent application No. 125,156/1980, using 1-amino-2-chloro-4-hydroxyanthraquinone and a phenol compound as the starting materials, the reaction is carried out in an aqueous medium in the presence of a phase transfer catalyst. This method requires a pressure apparatus, because the reaction is carried out at a temperature as high as 120° C. or more, and the starting material is limited only to 1-amino-2-chloro-4-hydroxyanthraquinone. If using 1-amino-2-bromo-4-hydroxyanthraquinone the reaction is carried out under the conditions described above, no desired dye compound capable of giving dyed products of a brilliant color can be obtained.

Furthermore, a method comprising carrying out the reaction in a non-polar organic solvent in the presence of a phase transfer catalyst is disclosed in Published Unexamined Japanese patent application No. 27,752/1983. This method also has defects such that yield of the desired dye compound is at most about 90%, and the catalyst must be used in an amount as large as 15% by weight or more based on the weight of the starting materials.

The present inventors have undertaken extensive studies to find a method for producing a 1-amino-2-phenoxy-4-hydroxyanthraquinone capable of giving dye products of a brilliant color in a high yield without defects associated with the known methods described above, and as a result found that the object can be accomplished by using a sulfolane as a reaction solvent.

The present invention provides a method for producing a 1-amino-2-unsubstituted or substituted phenoxy-4-hydroxyanthraquinone, which comprises carrying out a reaction between a 1-amino-2-halogeno-4-hydroxyanthraquinone and a phenol compound in a sulfolane in the presence of an acid nding agent.

The method of the present invention is illustrated below in detail.

Examples of the 1-amino-2-halogeno-4-hydroxyanthraquinone usable in the present method are 1-amino-2-bromo-4-hydroxyanthraquinone and 1-amino-2-chloro-4-hydroxyanthraquinone.

The phenol compound usable in the present method can be represented by the following formula (I),

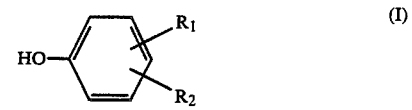

wherein $R_1$ and $R_2$ are independently a hydrogen or halogen atom or a hydroxyl, $C_1$–$C_4$ alkyl, $C_1$–$C_4$ alkoxy, $C_1$–$C_5$ cyanoalkyl, aralkyloxy, aryloxyalkoxy, alkylcarbonyloxy, arylcarbonyloxyalkyl or alkoxycarbonyloxy group.

Preferred examples of the phenol compound are phenol, hydroquinone, resorcinol, catechol, o-, m- or p-cresol, o-, m or p-methoxyphenol, o- or p-chlorophenol, o- or p-bromophenol, xylenols, 4-ethylphenol, 4-isopropylphenol, 4-tert-butylphenol, 2-methyl-4-cyanoethylphenol and the like. The phenol compound may be used in an amount of at least 1 mole, preferably from 1.1 to 3 moles, per mol of the 1-amino-2-halogeno-4-hydroxyanthraquinone.

The sulfolane usable in the present method as a solvent can be represented by the following formula (II),

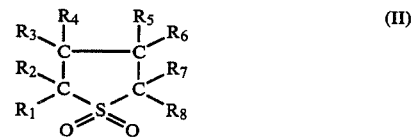

wherein $R_3$, $R_4$, $R_5$, $R_6$, $R_7$, $R_8$, $R_9$ and $R_{10}$ are independently a hydrogen atom or a $C_1$–$C_6$ alkyl or phenyl group.

Examples of the sulfolane are sulfolane, 3-methylsulfolane, 2-methylsulfolane, 2-ethylsulfolane, 2,5-dimethylsulfolane, 2,4-dimethylsulfolane, 2,3-dimethylsulfolane, 2,2-dimethylsulfolane, 3,4-dimethylsulfone, 3-ethylsulfolane, 2-propylsulfolane, 2-ethylsulfolane, 2-methyl-5-ethylsulfolane, 2-isopropylsulfolane, 2-ethyl-3-methylsulfolane, 2-methyl-2-ethylsulfolane, 2,2,5-trimethylsulfolane, 2,3,5-trimethylsulfolane, 3,4,5-trimethylsulfolane, 2,2,4-trimethylsulfolane, 2-meiyl-3-ethylsulfolane, 3-isopropylsulfolane, 2-methyl-5-propylsulfolane, 2-propyl-4-methylsulfolane, 2,3-dimethyl-5-ethylsulfolane, 2,4-dimethyl-5-ethylsulfolane, 2-methyl-5-isopropylsulfolane, 3-methyl-5-isopropylsulfolane, 2,3,4,5-tetramethylsulfolane, 2,2,4,5-tetramethylsulfolane, 2,2,5,5-tetramethylsulfolane, 2,2,-dimethyl-4-ethylsulfolane, 3-butylsulfolane, 2,3-dimethyl-5-propylsulfolane, 2-methyl-5-isopropylsulfolane, 2,5-dimethyl-3-methlsulfolane, 2-isobutyl-4-methylsulfolane, 2,2-dimethyl-5-isopropylsulfolane, 2,3-dimethyl-5-isopropylsulfolane, 3-ethyl-2-propylsulfolane, 2,5-dimethyl-5-ethylsulfolane, 2-tert-butyl-4-methylsulfolane, 2-hexylsulfolane, 2-ethyl-3-methyl-5-propylsulfolane, 2,3-dimethyl-5-butylsulfolane, 2-methyl-5-isobutylsulfolane, 2-methyl-4-ethyl-5-propylsulfolane, 2-isopentyl-3-methylsulfolane, 2,2-dimethyl-5-isobutylsulfolane, 2,3-dimethyl-5-isobutylsulfolane, 2-isopropyl-4-methyl-5-ethylsulfolane, 2,5-dimethyl-2,5-diethylsulfolane, 2,5-dimethyl-3,4-diethylsulfane, 3-methyl-5-hexylsulfolane, 2-methyl-2-hexylsulfolane, 2,5-dipropyl-3-methylsulfolane, 2-iropropyl-3-methyl-5-propylsulfolane, 2-ethyl-3-methyl-5-isobutylsulfolane, 2,5-diisorpopyl-3-methylsulfolane, 2,2,4-trimethyl-5-isobutylsulfolane, 3,4-di-tert-butylsulfolane, 2-phenylsulfolane, 3-phenylsulfolane, 2-phenyl-5-methylsulfolane, 3-phenyl-5-methylsulfolane, 2-phenyl-5-ethylsulfolane, 2-phenyl-3,4-dimethylsulfolane, 2-phenyl-5-propylsulfolane and the like. These sulfolanes may be used each alone or in a mixture of two or more. Of these, sulfolane, alkylsulfolanes, particularly 3-alkylsulfolanes such as 3-methylsulfolane, and a mixture of sulfolane and the alkylsulfolanes such as 3-methylsulfolane are preferred from industrial point of view. The sulfolane may be used in an amount of 1.5 to 10 times the weight of the 1-amino-2-halogeno-4-hydroxyanthraquinone.

The acid binding agent usable in the present method includes alkali metal or alkaline earth metal hydroxides, carbonates, phosphates, hydrogenphosphates, hydrogencarbonates and acetates. Examples thereof are sodium hydroxide, potassium hydroxide, lithium hydroxide, potassium carbonate, potassium phosphate, potassium acetate, sodium carbonate, lithium carbonate, sodium phosphate, sodium acetate, calcium hydroxide, magnesium hydroxide, sodium hydrogen carbonate, potassium hydrogen phosphate and the like. Industrially preferred are alkali metal carbonates such as potassium carbonate and sodium carbonate, and alkali metal hydroxides such as potassium hydroxide and sodium hydroxide. The acid binding agent may be used in an amount equivalent to the starting material or more.

The reaction between the 1-amino-2-halogeno-4-hydroxyanthraquinone and the phenol compound may be carried out at a temperature of 50° C. or higher, preferably from 70° to 140° C., and completed usually within 2 to 30 hours.

In this reaction, a quaternary ammonium compound or a quaternary phosphonium compound may be used as a catalyst.

The quaternary ammonium compound can be represented by the following formula (III),

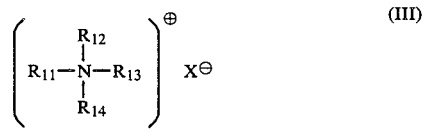
(III)

wherein $R_{11}$ and $R_{12}$ are independently a $C_1$–$C_{24}$ alkyl or unsubstituted or substituted benzyl group, $R_{13}$ and $R_{14}$ are independently a $C_1$–$C_{10}$ alkyl group, and X is an anionic residue, or the following formula (IV),

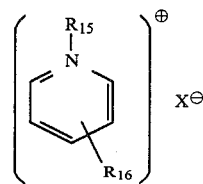
(IV)

wherein X is as defined above, $R_{15}$ is a $C_1$–$C_{24}$ alkyl group, and $R_{16}$ is a hydrogen atom or a methyl group.

The anionic residue X in the above formulae (III) and (IV) includes chlorine, bromine, iodine, hydroxyl and a residue of sulfates, phosphates, acetates, methyl sulfates, ethyl sulfates, hydrogensulfates, hydrogenphosphates, dihydrogenphosphates, carbonates, hydrogencarbonates, sulfites, hydrogensulfites, cyanides, cyanates, thiocyanates, nitrates and the like.

Examples of the quaternay ammonium compound are tetraalkyl quaternary ammonium compounds such as tetramethylammonium chloride, tetraethylammonium chloride, tetra-n-propylammonium chloride, tetra-n-butylammnoniumchloride, tetramethylammonium methylsulfate, tetraethylammonium ethylsulfate, triethylpropylamnonium chloride, octyltrimethylammonium chloride, dodecyltrimethylammonium chloride, hexadecyltrimethylammonium chloride, octadecyltrimethylammonium chloride, tetradecyltrimethylammonium chloride dioctadecyldimethylammonium chloride, diheptadecyldimethylammonium chloride, trioctylmethylammonium chloride and the like, benzyldi- or trialkylammonium compounds such as benzyltrimethylammonium chloride, benzyltriethylammonium chloride, benzyltripropylammonium chloride, benzylethyldipropylammonium chloride, dodecyldimethylbenzylammonium chloride, o-, m- or p-methoxybenzyltriethylammonium chloride, o-, m- or p-chlorobenzyltriethylammonium chloride, octylbenzyldimethylammonium chloride, diethyldibenzylammonium chloride and the like, and N-alkylpyridinium and N-alkylpicolinium compounds such as N-methylpyridinium chloride, N-ethylpyridinium chloride, N-butylpyridinium chloride, N-dodecylpyridinium chloride, N-octadecylpyridinium chloride, N-methylpicolinium chloride, N-butylpicolinium chloride, N-dodecylpicolinium chloride and the like. There are also exemplified other ammonium compounds corresponding to the above chlorides, such as bromides, iodides, hydroxides, sulfates, phosphates, hydrogensulfates, acetates, methylsulfates, ethylsulfates, hydrogenphosphates, dihydrogenphosphates, carbonates, hydrogencarbonates, sulfites, hydrogensulfites, cyanides, cyanates, thiocyanates and nitrates. These may be used each alone or in a mixture of two or more.

The quaternary phosphonium compounds usable can be represented by the following formula (V),

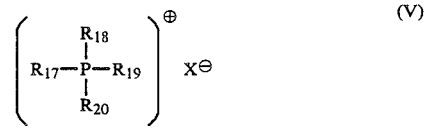
(V)

wherein X is as defined above, $R_{17}$ is a $C_1$–$C_{24}$ alkyl, phenyl or benzyl group, and $R^{18}$, $R_{19}$ and $R_{20}$ are independently a $C_1$–$C_{24}$ alkyl or phenyl group.

Examples of the quaternary phosphonium compound are tetraalkylphosphonium compounds such as tetramethylphosphonium chloride, tetraethylphosphonium chloride, tetrabutylphosphonium chloride, octyltriethylphosphonium chloride, hexadecyltriethylphosphonium chloride, hexadecyltributylphosphonium chloride, dodecyltrimethylphosphonium chloride, trioctylethylphosphonium chloride, tetradecyltriethylphosphonium chloride and the like, benzyltrialkylphosphonium compounds such as benzyltriethylphosphonium chloride, benzyltributylphosphonium chloride and the like, alkyltriphenylphosphonium compounds such as methyltriphenylphosphonium chloride, ethyltriphenylphosphonium chloride and the like, and tetraphenylphosphonium chloride. There are also exemplified other phosphonium compounds corresponding to the above chlorides, such as bromides, iodides, hydroxides, sulfates, phosphates, acetates, hydrogensulfates, hydrogenphosphates, methylsulfates, ethylsulfates, dihydrogenphosphates, carbonates, hydrogencarbonates, sulfites, hydrogensulfites, cyanides, cyanates, thiocyanates and nitrates. These may be used each alone or in a mixture of two or more.

Of these quaternary compounds, industrially preferred are tetra-lower alkylammonium and phosphonium compounds such as tetra-n-butylammonium bromide, tri-n-butylethylammonium chloride, tetrabutylphosphonium bromide and the like, benzyltrialkylammonium compounds such as benzyltrimethylammonium hydroxide, and triphenylalkylphosphonium compounds such as triphenylmethylphosphonium bromide. A mixture of the phosphonium compound and the ammonium compound may be used.

The quaternary ammonium or phosphonium compounds may be used within a considerably wide range of the amount without any trouble, but usually in an amount of 0.01 to 50% by weight based on the weight of the 1-amino-2-halogeno-4-hydroxyanthraquinone.

After the reaction is over, the reaction mixture may be diluted with a lower aliphatic alcohol such as methanol, ethanol and the like, or water, or a diluted aqueous alkali solution, or may be cooled, thereby precipitating crystals, which can be collected on a filter.

According to the method of the present invention, amounts of the phenol compound and the acid binding agent can be decreased to a considerable extent, and the selectivity of the reaction can be increased, so that the desired 1-amino-2-phenoxy-4-hydroxyanthraquinone having a high purity can be obtained almost quantitatively. A color shade of the product dyed with the thus obtained compound is similar, or in many cases, yellowish and more brilliant, as compared with those of the dye compound obtained by the aforesaid known methods.

The method of the present invention is illustrated in more detail with reference to the following Examples, wherein parts and % are by weight.

EXAMPLE 1

A mixture of 97.3% purity 1-amino-2-bromo-4-hydroxyanthraquinone (20 parts), potassium carbonate (5.2 parts : 1.2 equivalents) and phenol (11.8 parts : molar ratio 2) in sulfolane (60 parts) was heated to 120° C., while being stirred thoroughly. Stirring was continued for 8 hours at a temperature between 120° and 125° C., and then the starting anthraquinone compound disappeared chromatographically completely. The reaction mixture was mixed with water (60 parts) at 60° C., and then cooled to 30° C. to precipitate crystals. The crystals collected on a filter were washed thoroughly with a 2% aqueous sodium hydroxide solution and hot water, and then dried to obtain a reddish violet crystalline powder (20.1 parts).

The purity of 1-amino-2-phenoxy-4-hydroxyanthraquinone was found to be 98.6%, and the yield was 97.8%. The product obtained was used to dye polyester fibers, obtaining a dyed product of a red color, which was yellowish and more brilliant, as compared with that of a product dyed with the corresponding compound obtained in a known manner.

EXAMPLE 2

A mixture of 97.3% purity 1-amino-2-bromo-4-hydroxyanthraquinone (20 parts), potassium hydroxide (4.2 parts) and phenol (9.4 parts) in sulfolane (100 parts) was heated to 130° C., while being stirred thoroughly, and stirred for 4 hours at a temperature between 130° and 135° C. Then, the starting anthraquinone compound disappeared chromatographically completely. The reaction mixture was after-treated in the same manner as in Example 1, then obtaining a reddish violet crystalline powder (19.8 parts).

The purity of 1-amino-2-phenoxy-4-hydroxyanthraquinone was found to be 98.5%. The yield was 96.3%. The obtained product was used to dye polyester fibers, obtaining a dyed product of a red color, which was yellowish and more brilliant than that of a dyed product with the corresponding compound obtained in a known manner.

EXAMPLE 3

A mixture of 97.3% purity 1-amino-2-bromo-4-hydroxyanthraquinone (20 parts), potassium carbonate (5.2 parts), phenol (11.8 parts) and tetra-n-butylammonium bromide (0.6 part) in sulfolane (100 parts) was heated to 115° C., while being stirred thoroughly, and stirred for 7 hours at that temperature. Then, the starting material disappeared chromatographically completely.

Successively, the reaction mixture was cooled to 20° C. to precipitate crystals. The crystals collected on a filter were washed with methanol and hot water in this order, and then dried to obtain a reddish violet crystalline powder (20.0 parts).

The purity of 1-amino-2-phenoxy-4-hydroxyanthraquinone was found to be 99.0%. The yield was 97.8%. The obtained product was used to dye polyester fibers, obtaining a dyed product of a red color, which was yellowish and more brilliant, as compared with that of a dyed product with the corresponding compound obtained in a known manner.

The above manner can be repeated using any of the following quaternary compounds in place of the tetra-n-butylammonium bromide, then obtaining similar result.
Tetrabutylphosphonium bromide
Tri-n-butylethylammonium chloride
Methyltriphenylphosphonium bromide
Trioctylmethylammonium chloride
Dibenzyldimethylammonium chloride
N-Butylpyridinium chloride

EXAMPLES 4 to 6

Example 1 was repeated, provided that the solvent described in the following table was used in place of sulfolane (60 parts), whereby 1-amino-2-phenoxy-4-hydroxyanthraquinone characterized by the shade as shown in the following table was obtained in the purity and yield also as shown in the following table.

| Example No. | Solvent (parts) | Yield (parts) | Purity (%) | Shade as compared with a conventional one |
|---|---|---|---|---|
| 4 | 3-Methylsulfolane (60) | 20.0 | 97.0 | Yellowish, brilliant |
| 5 | Sulfolane (40) 3-Methylsulfolane (20) | 19.9 | 98.0 | Yellowish, brilliant |
| 6 | Sulfolane (25) 3-Methylsulfolane (75) | 19.8 | 98.5 | Brilliant |

EXAMPLE 7

A mixture of 92.0% purity 1-amino-2-chloro-4-hydroxyanthraquinone (20 parts), potassium hydroxide (4.5 parts), phenol (8.2 parts) and benzyltrimethylammonium hydroxide (a 40% methanol solution, 1.5 parts) was heated to 100° C., while being stirred thoroughly, and stirred at that temperature, until the starting compound disappeared chromatographically completely. Methanol (80 parts) was added to the reaction mixture at 80° C., and the resulting mixture was cooled to 20° C. to precipitate crystals. The crystals collected on a filter were washed with methanol and hot water in this order, and then dried to obtain a reddish violet crystalline powder (21.8 parts). The purity of 1-amino-2-phenoxy-4-hydroxyanthraquinone was found to be 98.5%. The yield was 96.4%.

The thus obtained product was used to dye polyester fibers, obtaining a dyed product of a red color, which was yellowish and more brilliant than that of a conventional one.

EXAMPLES 8 to 11

Example 1 was repeated, provided that each phenol compound described in the following table was used in place of phenol (11.8 parts), then obtaining each corresponding anthraquinone compound in a purity and yield as shown in the following table.

| Example No. | Phenol compound (parts) | Product obtained | Yield (parts) | Purity (%) |
|---|---|---|---|---|
| 8 | p-Cresol (13.6) | 1-Amino-2-(4-methylphenoxy)-4-hydroxyanthraquinone | 20.1 | 98.0 |
| 9 | 4-Chlorophenol (16.4) | 1-Amino-2-(4-chlorophenoxy)-4-hydroxyanthraquinone | 21.6 | 97.5 |
| 10 | m-Cresol (13.6) | 1-Amino-2-(4-methylphenoxy)-4-hydroxyanthraquinone | 20.5 | 97.7 |
| 11 | Resorcinol (20.0) | 1-Amino-2-(3-hydroxyphenoxy)-4-hydroxyanthraquinone | 20.3 | 97.5 |

EXAMPLES 12 to 15

Example 3 was repeated, provided that each phenol compound described in the following table was used in place of phenol (11.8 parts), then obtaining each corresponding anthraquinone compound in a purity and yield as shown in the following table.

| Example No. | Phenol compound (parts) | Product obtained | Yield (parts) | Purity (%) |
|---|---|---|---|---|
| 12 | 2-Methyl-4-cyanoethylphenol (20.3) | 1-Amino-2-(2-methyl-4-cyanoethylphenoxy)-4-hydroxyanthraquinone | 23.6 | 97.1 |
| 13 | 4-Bromophenol (22.0) | 1-Amino-2-(4-bromophenoxy)-4-hydroxyanthraquinone | 24.2 | 97.5 |
| 14 | 4-Methoxyphenol (15.8) | 1-Amino-2-(4-methoxyphenoxy)-4-hydroxyanthraquinone | 21.4 | 98.2 |
| 15 | Hydroquinone (20.0) | 1-Amino-2-(4-hydroxyphenoxy)-4-hydroxyanthraquinone | 20.6 | 97.7 |

What is claimed is:

1. A method for producing a 1-amino-2-unsubstituted or substituted phenoxy-4-hydroxyanthraquinone, which comprises carrying out a reaction between a 1-amino-2-halogeno-4-hydroxyanthraquinone and a phenol compound at a temperature of 50° C. or higher in a sulfolane in the presence of an acid binding agent and in the presence or absence of a quaternary compound.

2. A method according to claim 1, wherin the 1-amino-2-halogeno-4-hydroxyanthraquinone is 1-amino-2-bromo-4-hydroxyanthraquinone or 1-amino-2-chloro-4-hydroxyanthraquinone.

3. A method according to claim 1, wherein the phenol compound is a member selected from compounds represented by the formula,

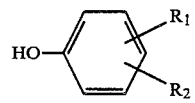

wherein $R_1$ and $R_2$ are independently a hydrogen or halogen atom or a hydroxyl, $C_1$-$C_4$ alkyl, $C_1$-$C_4$ alkoxy, or $C_1$-$C_5$ cyanoalkyl group.

4. A method according to claim 1, wherein the phenol compound is used in an amount of 1 mole or more per mole of the 1-amino-2-halogeno-4-hydroxyanthraquinone.

5. A method according to claim 1, wherein the sulfolane is at least one member selected from compounds represented by the formula,

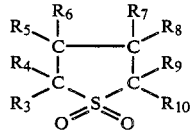

wherein $R_3$, $R_4$, $R_5$, $R_6$, $R_7$, $R_8$, $R_9$ and $R_{10}$ are independently a hydrogen atom or a $C_1$-$C_6$alkyl or phenyl group.

6. A method according to claim 5, wherein the sulfolane is sulfolane or a 3-$C_1$-$C_6$ alkylsulfolane or a mixture thereof.

7. A method according to claim 1, wherein the sulfolane is used in an amount of 1.5 to 10 times the weight of the 1-amino-2-halogeno-4-hydroxyanthraquinone.

8. A method according to claim 1, wherein the acid binding agent is a member selected from alkali metal or alkaline earth metal hydroxides, carbonates, phosphates, hydrogenphosphates, hydrogencarbonates and acetates.

9. A method according to claim 1, wherein the reaction is carried out at a temperature of 70° to 140° C.

10. A method according to claim 1, wherein the reaction is carried out in the presence of at least one quaternary compound selected from quaternary ammonium compounds and quaternary phosphonium compounds.

11. A method according to claim 10, wherein the quaternary compound is used in an amount of 0.01 to 50% by weight based on the weight of the 1-amino-2-halogeno-4-hydroxyanthraquinone.

* * * * *